Oct. 16, 1945.  S. L. TRAVERS  2,386,758
WOOD JOINING FASTENER
Filed June 15, 1945

INVENTOR
SAMUEL L. TRAVERS
BY
ATTORNEY

Patented Oct. 16, 1945

2,386,758

UNITED STATES PATENT OFFICE 2,386,758

WOOD JOINING FASTENER

Samuel L. Travers, Bronx, N. Y.

Application June 15, 1945, Serial No. 599,716

6 Claims. (Cl. 85—11)

This invention relates to new and useful improvements in a wood joining fastener.

More particularly, the invention proposes a fastener as mentioned which is characterized by a circularly shaped sheet metal member bendable to engage upon the end of a dowel or rod, and then having an end wall continuing into a skirt wall for engaging into an opening of a part to which said dowel or rod is to be connected.

The new and improved wood joining fastener may be used on square rods, or rods of different cross sectional areas.

The invention also proposed to provide the said sheet metal member with prongs for assisting in firmly connecting said dowel or rod and said part together. It is proposed that some of these prongs be arranged upon that portion of the member which will become the end wall portion. It is also proposed that some of said prongs be arranged on those portions of said member which are to become the skirt wall portion.

Still further the invention proposes to form the prongs with pointed portions so that they may better grip and engage portions of said dowel or rod and part to which said dowel or rod is to be connected.

The invention also contemplates numerous modified forms all of which embody the dominating feature.

Another object of the invention is the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
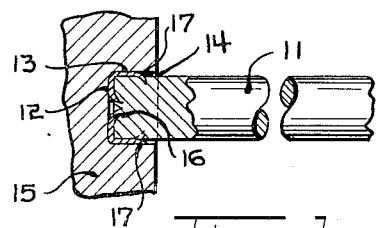
Fig. 1 is a fragmentary sectional view of a dowel or rod and a part connected with a wood joining fastener in accordance with this invention.
Figure 2:
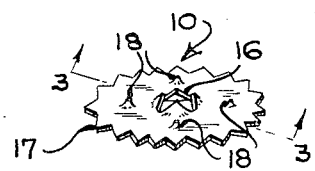
Fig. 2 is a perspective view of the wood joining fastener used to join the dowel or rod and part shown in Fig. 1, but illustrated before it is bent.
Figure 3:
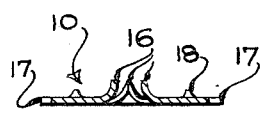
Fig. 3 is a sectional view taken on the line 3—3 of Fig. 2.

The wood joining fastener, in accordance with that form of the invention illustrated in Figs. 1-3 inclusive, includes a circularly shaped sheet material member 10 bendable to engage upon the end of a dowel or rod 11 and then having an end wall 12 continuing into a skirt wall 13 for engaging into an opening 14 of a part 15 to which said dowel or rod 11 is to be connected. Preferably, the dowel or rod 11 and part 15 are of wood.

The circularly shaped member 10 is provided with a central group of prongs 16 and an outer group of prongs 17 for assisting in firmly connecting said dowel or rod 11 and part 15 together. The central group of prongs 16 are stamped from the central portion of the member 10 and are located in that portion which becomes the end wall 12 when the member 10 is engaged on the dowel or rod 11. The group of prongs 17 is located along the outer periphery of the member 10 so that they are positioned along the edge portion of the skirt wall 13 when the member 10 is mounted on the dowel or rod 11. The member 10 is formed with a plurality of nipple-like sharp extensions 18 protruding from one face of the said member for better gripping the dowel or rod 11.

The operation and use of this form of the invention may be understood from the following: The wood joining fastener is manufactured and sold in the form as illustrated in Figs. 2 and 3. It may be mounted on the end of a dowel or rod 11 of a size within a certain size range. It is mounted in position on the end of the dowel or rod 11 by engaging the central prongs 16 into the end thereof. The sheet metal member 10 is then bent around the end portion of the dowel or rod 11 so as to form the skirt wall 13. In this condition the end portion of the dowel or rod 11 with the fastener in position is forced into the opening 14. It will be found that the parts will be firmly joined together with this fastener.

Figure 5:
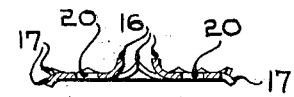
Fig. 5 is a sectional view taken on the line 5—5 of Fig. 4.
Figure 4:
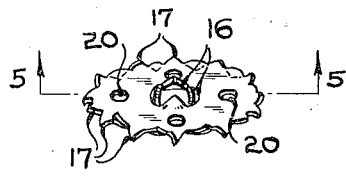
Fig. 4 is a perspective view of another wood joining fastener embodying another feature of this invention.

In Figs. 4 and 5 a modified form of the invention has been disclosed which distinguishes from the prior form in several ways. The sheet metal member 10 is formed with a plurality of apertures or openings 20 located at positions at which the member 10 will be bent when it is mounted on a dowel or rod, to form the end wall and the skirt wall of the wood joining fastener. The purpose of these openings 20 is to make it easier to bend the fastener into the form stated. Moreover, the group of prongs 17 are bent alternately upwards and downwards, as clearly shown in Fig. 4. The prongs 17 which are bent in one direction will engage against the adjacent face of the end portion of the dowel or rod, while the remaining prongs 17 will engage against the face of the opening into which the dowel or rod is forced.

In other respects this form of the invention is identical to the previous form and like parts are indicated by like reference numerals.

Figure 6:
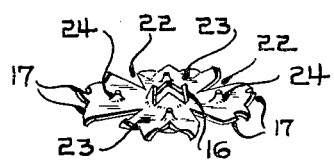
Fig. 6 is another perspective view of still another wood joining fastener embodying still another form of this invention.

In Fig. 6 still another embodiment of the invention has been disclosed which is very similar to the prior form, distinguishing in the fact that the member 10 is formed with a plurality of dart-like openings 22 extended inwards from its periphery and dividing off segmental sections 23 which may be more easily bent so as to form the fastener into the shape of an end wall and a skirt wall, as already stated. This form of the invention is also provided with nipple-like sharp extensions 24.

In other respects this form of the invention is similar to that previously shown and like reference numerals identify like parts in each of the several views.

Figure 7:
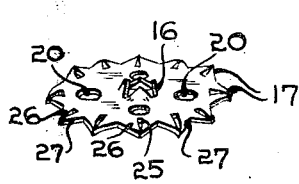
Fig. 7 is still another perspective of another wood joining fastener constructed in accordance with a modified form of this invention.
Figure 8:
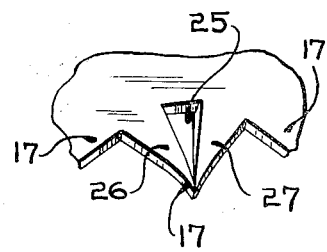
Fig. 8 is a fragmentary enlarged detailed view of a portion of Fig. 7.

In Figs. 7 and 8 another embodiment of the invention is disclosed which is very similar to the form shown in Fig. 6, distinguishing further in the fact that each of the prongs 17 is formed with small triangularly shaped openings 25 having their apexes coinciding with the pointed ends of the prongs. The purpose of these triangularly shaped openings 25 is to divide the prongs into separate side sections 26 and 27 which are free so that the prongs have greater flexibility.

In other respects this form of the invention is similar to that previously shown and like reference numerals identify like parts in each of the several views.

Figure 9:
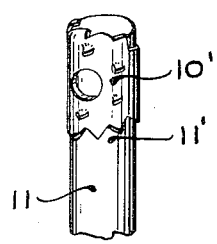
Fig. 9 is a perspective view showing another application of the wood joining fastener.

In Fig. 9 the sheet material member 10 is shown to be secured on the periphery 11' of the dowel or rod 11. In other respects this form of the invention is similar to the previous forms.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A wood joining fastener, comprising a circularly shaped sheet metal member bendable to engage upon the end of a dowel or rod and then having an end wall continuing into a skirt wall for engaging into an opening of a part to which said dowel or rod is to be connected.

2. A wood joining fastener, comprising a circularly shaped sheet metal member bendable to engage upon the end of a dowel or rod and then having an end wall continuing into a skirt wall for engaging into an opening of a part to which said dowel or rod is to be connected, and prongs formed on said member for assisting in firmly connecting said dowel or rod and part together.

3. A wood joining fastener, comprising a circularly shaped sheet metal member bendable to engage upon the end of a dowel or rod and then having an end wall continuing into a skirt wall for engaging into an opening of a part to which said dowel or rod is to be connected, said prongs being located on that portion on said member which will form said end wall portion.

4. A wood joining fastener, comprising a circularly shaped sheet metal member bendable to engage upon the end of a dowel or rod and then having an end wall continuing into a skirt wall for engaging into an opening of a part to which said dowel or rod is to be connected, and prongs formed on said member for assisting in firmly connecting said dowel or rod and part together, some of said prongs being formed upon that portion of said member which will form said skirt portion.

5. A wood joining fastener, comprising a circularly shaped sheet metal member bendable to engage upon the end of a dowel or rod and then having an end wall continuing into a skirt wall for engaging into an opening of a part to which said dowel or rod is to be connected, and prongs formed on said member for assisting in firmly connecting said dowel or rod and part together, some of said prongs being formed upon the periphery of said member so as to be located on the edge portion of said skirt wall portion when formed.

6. A wood joining fastener, comprising a circularly shaped sheet metal member bendable to engage upon the end of a dowel or rod and then having an end wall continuing into a skirt wall for engaging into an opening of a part to which said dowel or rod is to be connected, and prongs formed on said member for assisting in firmly connecting said dowel or rod and part together, said prongs having pointed ends, and triangularly shaped openings in said prongs to form separate side sections which are free to be more resilient.

SAMUEL L. TRAVERS.